United States Patent [19]

Winnik et al.

[11] Patent Number: 5,139,574

[45] Date of Patent: Aug. 18, 1992

[54] INK COMPOSITIONS

[75] Inventors: Françoise M. Winnik, Toronto; Marcel P. Breton, Mississauga; William Riske, Burlington, all of Canada

[73] Assignee: Xerox Corporation, Stamford, Conn.

[21] Appl. No.: 646,046

[22] Filed: Jan. 28, 1991

[51] Int. Cl.$^5$ ............................................. C09D 11/00
[52] U.S. Cl. ........................................... 106/22; 106/20
[58] Field of Search ................. 106/27, 410, 20–22; 346/1.1

[56] References Cited

U.S. PATENT DOCUMENTS

| | | | |
|---|---|---|---|
| 4,228,438 | 10/1980 | Vazirani | 346/1.1 |
| 4,597,794 | 7/1986 | Ohta et al. | 106/20 |
| 4,680,332 | 7/1987 | Hair et al. | 524/377 |
| 4,733,247 | 3/1988 | Arai et al. | 346/1.1 |
| 4,783,220 | 11/1988 | Gamble et al. | 106/27 |
| 4,836,852 | 6/1989 | Knirsch et al. | 106/22 |
| 4,877,451 | 10/1989 | Winnik et al. | 106/23 |

OTHER PUBLICATIONS

Ikemi, Masahisa; Macromolecules 1981, 14(1), 34–9 (Eng.).

Primary Examiner—William R. Dixon, Jr.
Assistant Examiner—Margaret V. Einsmann
Attorney, Agent, or Firm—Judith L. Byorick

[57] ABSTRACT

Disclosed is an ink composition which comprises an aqueous liquid vehicle, a water-soluble dye, and particles of a block copolymer of the formula ABA, wherein A represents a hydrophilic segment and B represents a hydrophobic segment, said ABA particles having an average diameter of about 300 Angstroms or less. The ink is particularly suitable for use in ink jet printing systems, especially thermal ink jet printing systems.

13 Claims, No Drawings

INK COMPOSITIONS

BACKGROUND OF THE INVENTION

The present invention is directed to liquid ink compositions. More specifically, the present invention is directed to aqueous based ink compositions particularly suitable for use in ink jet printing processes. One embodiment of the present invention is directed to an ink composition which comprises an aqueous liquid vehicle, a water-soluble dye, and particles of a block copolymer of the formula ABA, wherein A represents a hydrophilic segment and B represents a hydrophobic segment, said ABA particles having an average diameter of about 300 Angstroms or less. Optionally, silica is precipitated within the micelles.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionally, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Heterophase ink jet inks are also known.

U.S. Pat. No. 4,877,451 (Winnik et al.), the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, copending application U.S. Ser. No. 07/369,003, the disclosure of which is totally incorporated herein by reference, discloses ink jet inks and liquid developers containing colored particles comprising hydrophilic porous silica particles to the surfaces of which dyes are covalently bonded through silane coupling agents.

U.S. Pat. No. 4,228,438 (Vazirani) discloses a jet electrostatic printing process which uses an ink formulation suitable for use on dark colored surfaces. The ink comprises a prepolymer, pigments, and additives such as coupling agents, surface modifiers, and conductivity enhancing materials. The prepolymer may comprise aliphatic and aromatic polymers. The pigment particle size is less than 5 microns, which results in a uniform droplet weight. The additives may include silane coupling agents.

U.S. Pat. No. 4,597,794 (Ohta et al.) discloses an ink jet recording process which comprises forming droplets of an ink and recording on an image receiving material by using the droplets. The ink is prepared by dispersing fine particles of pigment into an aqueous dispersion medium containing a polymer having both a hydrophilic and a hydrophobic construction portion. The particle diameter of the pigment is in microns and is related to the molecular weight of the pigment.

U.S. Pat. No. 4,680,332 (Hair et al.) discloses a heterophase ink composition comprising a water insoluble polymer dispersed in a liquid medium, the polymer containing therein an oil soluble dye, and a nonionic stabilizer permanently attached thereto. The particles have diameters of 0.5 micron or less to prevent nozzle clogging.

U.S. Pat. No. 4,783,220 (Gamble et al.) discloses ink compositions consisting of small unilamellar or multilamellar vesciles formed from surfactants of anionic, cationic, zwitterionic, and nonionic molecules having an oil soluble dye, inclusive of a lipid-soluble dye associated therewith. The dye to surfactant ratio is preferably from about 1:1 to about 1:10 by weight. The resulting ink is from about 100 to about 400 nanometers in diameter. The lipid soluble dye molecules have a hydrophobic and a hydrophilic region. The compositions are useful in traditional printing techniques such as flexography and rotogravure and in electronic printing systems such as with an ink jet printer.

U.S. Pat. No. 4,836,852 (Knirsch et al.) discloses an ink formed by a solution of a direct dye in a mixture of water and glycol wetting agents, to which a pigment which is finely ground to particles of dimensions of not more than 1000 Angstroms is added in dispersion in a concentration of between 0.1 and 2 percent. The pigment particles serve to anchor the gaseous nuclei of gases which are dissolved in the ink for the purpose of stabilizing the boiling point of the ink. The ink is particularly suited to an ink jet printer of the type in which expulsion of the droplets is produced by causing instantaneous vaporization of a portion of ink in a nozzle.

Copending Application U.S. Ser. No. 544,564, entitled "Inks Containing Colored Block Copolymer Micelles", with the named inventors Francoise Winnik, Peter Hofstra, and Paul Gerroir, the disclosure of which is totally incorporated herein by reference, discloses an ink composition which comprises an aqueous liquid vehicle and colored particles of an average diameter of 50 nanometers or less which comprise micelles of block copolymers of the formula ABA, wherein A represents a hydrophilic segment and B represents a hydrophobic segment, and wherein dye molecules are covalently attached to the micelles. Optionally, silica is precipitated within the micelles. Also disclosed is an ink preparation process which comprises, in the order stated (1) adding to water a block copolymer of the formula ABA, wherein A represents a hydrophilic segment and B represents a hydrophobic segment, thereby forming a dispersion of micelles of the block copolymer; (2) adding a water-soluble base to the dispersion, thereby bringing the pH of the dispersion to at least 8; (3) adding to the dispersion a solution comprising water and a reactive dye capable of reacting with the block copolymer, thereby forming colored polymeric micelles; and (4) admixing the colored micelles with an aqueous liquid vehicle to form an ink composition. Optionally, silica is precipitated in the micelles by addition of a tetraalkoxysilane to the micelles prior to addition of the water-soluble base.

Although known compositions and processes are suitable for their intended purposes, a need remains for improved ink compositions suitable for use in ink jet printing processes. In addition, a need remains for ink compositions that enable increased drop volume when used in ink jet printing processes. Further, there is a need for ink composition that exhibit improved waterfastness. There is also a need for ink compositions that exhibit improved print quality. Additionally, there is a need for ink compositions that enable the above advantages and also exhibit good drying times and optical densities. In addition, there is a need for ink compositions that enable control of the ink drop volume in an ink jet printer without the need for printhead modifications.

SUMMARY OF THE INVENTION

It is an object of the present invention to provide improved ink compositions suitable for use in ink jet printing processes.

It is another object of the present invention to provide ink compositions that enable increased drop volume when used in ink jet printing processes.

It is yet another object of the present invention to provide ink compositions that exhibit improved waterfastness.

It is still another object of the present invention to provide ink compositions that exhibit improved print quality.

Another object of the present invention is to provide ink compositions that enable the above advantages and also exhibit good drying times and optical densities.

Yet another object of the present invention is to provide ink compositions that enable control of the ink drop volume in an ink jet printer without the need for printhead modifications.

These and other objects of the present invention can be achieved by providing an ink composition which comprises an aqueous liquid vehicle, a water soluble dye, and particles of a block copolymer of the formula ABA, wherein A represents a hydrophilic segment and B represents a hydrophobic segment, said ABA particles having an average diameter of about 300 Angstroms or less. Optionally, silica is precipitated within the micelles. Another embodiment of the present invention is directed to a printing process which comprises applying an ink according to the present invention to a substrate in imagewise fashion. In a specific embodiment, the present invention includes a process which comprises incorporating into an ink jet printing apparatus an ink composition according to the present invention and causing droplets of the ink to be ejected in an imagewise pattern onto a substrate, thereby generating images on the substrate. In a particularly preferred embodiment, the apparatus is a thermal ink jet printer and the ink is selectivity heated in imagewise fashion, thereby causing ejection of the droplets to form an image on the substrate.

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50. The non-water component of the liquid vehicle generally serves as a humectant which has a boiling point higher than that of water (100° C.). In the inks employed for the process of the present invention, the liquid vehicle is present in any effective amount, typically from about 85 to about 99.5 percent by weight, and preferably from about 90 to about 99 percent by weight.

Inks of the present invention contain a water soluble dye. Generally, any effective dye, such as one of the direct dyes or the acid dyes, can be selected as the colorant, provided that it is compatible with the other ink components and is soluble in the liquid vehicle. Examples of suitable dyes include anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokil); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Company (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Acid Yellow XX-SF LP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. The dye is present in the ink composition in any effective amount, generally from about 0.5 to about 10 percent by weight, and preferably from about 2 to about 6 percent by weight.

The inks of the present invention contain polymeric particles or micelles. The polymeric micelles comprise polymolecular aggregates, generally with an average diameter of about 300 Angstroms or less, and preferably about 200 Angstroms or less, of a block copolymer. The block copolymer is of the ABA type, wherein the outer A segments are hydrophilic and the inner B segment is hydrophobic. The terms hydrophobic and hydrophilic as used herein are relative, in that the polymer contains two A segments and a B segment, wherein the A segments are hydrophilic with respect to the B segment. The A segments also exhibit good water solubility, typically being soluble in water in a concentration of at least about 0.2 gram per milliliter, while the B segment exhibits poor water solubility, typically being soluble in water in a concentration of no more than about 0.01 gram per milliliter. When dispersed in water at concentrations of, for example, from about 0.05 to about 10 grams per liter, the block copolymers form polymolecular micelles with a hydrophobic core and a hydrophilic shell, said micelles generally having an average diameter of about 300 Angstroms or less.

Examples of suitable monomers for the A block include oxyethylene monomers and aminoethylene monomers. The number of oxyethylene monomers per block typically is from about 5 to about 400 monomeric units, and preferably from about 50 to about 300 monomeric units.

Also suitable are vinyl carboxylic acids and their corresponding esters of the general formula:

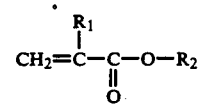

wherein $R_1$ and $R_2$ are independently selected from hydrogen and alkyl groups with from 1 to about 20 carbon atoms, including acrylic acid, methacrylic acid, paracarboxystyrene, and the like.

Also suitable are oxazolines of the general formula

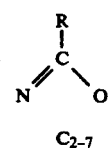

$C_{2-7}$ wherein R is hydrogen, an alkyl group with from 1 to about 6 carbon atoms, or benzyl and the ring has from about 2 to about 7 carbon atoms in addition to the carbon atom situated between the nitrogen and oxygen atoms, including ethyloxazoline, and the like.

Also suitable are acrylamides of the general formula

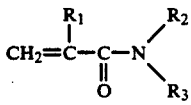

wherein $R_1$ is hydrogen, methyl, or ethyl, and $R_2$ and $R_3$ are independently selected from hydrogen, alkyl groups with from 1 to about 4 carbon atoms, hydroxyalkyl groups with from 1 to about 4 carbon atoms, such as 2-hydroxyethyl, 2-hydroxypropyl, 3-hydroxypropyl, 2-hydroxybutyl, 3-hydroxybutyl, 4-hydroxybutyl, and the like, and amino-substituted alkyl groups, such as 2-aminoethyl, 2-aminopropyl, 3-aminopropyl, 2-aminobutyl, 3-aminobutyl, 4-aminobutyl, and the like.

Also suitable are vinyl ethers of the general formula

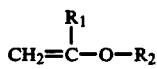

wherein $R_1$ is selected from the group consisting of hydrogen, methyl, and ethyl, and $R_2$ is selected from hydroxy-substituted alkyl groups, such as 2-hydroxyethyl, 2-hydroxypropyl, 3-hydroxypropyl, 2-hydroxybutyl, 3-hydroxybutyl, 4-hydroxybutyl, and the like, and amino-substituted alkyl groups, such as 2-aminoethyl, 2-aminopropyl, 3-aminopropyl, 2-aminobutyl, 3-aminobutyl, 4-aminobutyl, and the like. Mixtures of two or more monomers can also be employed in the hydrophilic block. In addition, the two A segments in the ABA block copolymer employed for the present invention need not be of identical composition, but can each be of different monomers, structure, and/or composition.

The molecular weight of each A segment or block is such that the segment is soluble in water. Typically, the molecular weight of each A segment is from about 500 to about 20,000 (weight average molecular weight), although the molecular weight can be outside of this range.

Examples of suitable monomers for the B block include oxypropylene monomers; the number of oxypropylene groups typically is from about 5 to about 100 monomeric units, and preferably from about 20 to about 60 monomeric units. Other suitable monomers for the B block include vinyl monomers, such as styrene, styrene derivatives and cogeners such as alkyl styrenes wherein the alkyl group has from 1 to about 20 carbon atoms, halogenated styrenes such as p-chlorostyrene, vinyl naphthalene, and the like, vinyl halides such as vinyl chloride, vinyl bromide, vinyl fluoride, and the like, vinyl ethers, such as methyl vinyl ether, vinyl ethyl ether, and the like, vinyl ketones, such as vinyl methyl ketone and the like, N-vinyl indole, vinyl esters, such as vinyl acetate, vinyl propionate, vinyl benzoate, and vinyl butyrate, and the like; acrylic esters of monocarboxylic acids, such as acrylates and alkylacrylates with the alkyl group having at least 1 carbon atom, and generally from about 1 to about 12 carbon atoms, such as methacrylates, methylacrylates, ethacrylates, ethylacrylates, and the like, including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylic monomers and esters of monocarboxylic acids, such as acrylates and alkylacrylates with the alkyl group having at least 1 carbon atom and 1 hydroxy group, and generally from about 2 to about 12 carbon atoms, such as 2-hydroxyethyl methacrylate, 2-hydroxyethyl acrylate, 3-hydroxypropyl methacrylate, 3-hydroxypropyl acrylate, 4-hydroxybutyl methacrylate, 4hydroxybutyl acrylate, and the like; olefins, including monoolefins and polyolefins, such as ethylene, propylene, butylene, butadiene, isobutylene, cycloolefins, such as cyclopentene. The hydrophobic segment can also be derived by the condensation polymerization of difunctional monomers to yield polyesters, polyamides, polyurethanes, or the like, such as polyethyleneterephthalate, polyhexamethylene adipamide (nylon 6,6), or the like. Mixtures of two or more monomers can also be employed in the hydrophobic block.

The molecular weight of the B segment or block is such that the segment is insoluble in water. Typically, the molecular weight of the B segment is from about 500 to about 20,000 (weight average molecular weight), although the molecular weight can be outside of this range.

Examples of suitable ABA block copolymers for the present invention include Pluronic F-68, an ethylene oxide-propylene oxide-ethylene oxide block copolymer wherein the ethylene oxide blocks have an average molecular weight of 3340 and the propylene oxide block has an average molecular weight of 1750, available from BASF, Pluronic F-38, an ethylene oxide-propylene oxide-ethylene oxide block copolymer wherein the ethylene oxide blocks have an average molecular weight of 2000 and the propylene oxide block has an average molecular weight of 950, available from BASF, Pluronic F-88, an ethylene oxide-propylene oxide-ethylene oxide block copolymer wherein the ethylene oxide blocks have an average molecular weight of 4320 and the propylene oxide block has an average molecular weight of 3250, available from BASF, Pluronic F-98, an ethylene oxide-propylene oxide-ethylene oxide block copolymer wherein the ethylene oxide blocks have an average molecular weight of 5400 and the propylene oxide block has an average molecular weight of 2750 available from BASF, and Pluronic F-108, an ethylene oxide-propylene oxide-ethylene oxide block copolymer wherein the ethylene oxide blocks have an average molecular weight of 5600 and the propylene oxide block has an average molecular weight of 3250, available from BASF.

Other suitable ABA block copolymers for the present invention include amphiphilic block copolymers of vinyl ethers, prepared for example by living cationic polymerization, as described in M. Minoda, M. Sawamoto, and T. Higashimura, *Macromolecules*, 23, 1989, 1990, wherein the A blocks are 2-hydroxyethyl vinylether polymers of average molecular weight 2000 and the B block is a polymer of butyl vinyl ether of average molecular weight 1500. Other suitable ABA block copolymers for the present invention include block copolymers of ethylene oxide and 2-hydroxyethyl methacrylate, prepared for example as described in M. Ikemi, N. Odagiri, and I. Shinohara, *Polymer Journal*, 12, 777, 1980, wherein the ethylene oxide blocks have an average molecular weight of 7200 and the 2-hydroxyethyl methacrylate block has an average molecular weight of 1900.

To prepare the polymeric micelles, the selected block copolymer is first admixed with water, preferably water that has been distilled or deionized. The block copolymer is added to the water in an amount sufficient to ensure micelle formation, and generally is added in a concentration of from about 0.05 percent by weight to about 5 percent by weight. The colorless polymolecular micelles obtained are of an average diameter of about 300 nanometers or less. The mixture is purified by an ultrafiltration process using, for example, membranes with a molecular weight cut-off of 100,000 to remove low molecular weight impurities. Subsequent to purification, the suspension of micelles can be concentrated for use in an ink or isolated by freeze-drying. Optionally, the polymeric micelles can be colored by reacting them with a dye to obtain particles having dye molecules covalently attached thereto, as disclosed in copending application U.S. Ser. No. 07/544,564, entitled "Inks Containing Colored Block Copolymer Micelles", with the named inventors Francoise Winnik, Peter Hofstra, and Paul Gerroir, the disclosure of which is totally incorporated herein by reference.

In one specific embodiment of the present invention, the polymeric micelles comprise a hydrophobic core and a hydrophilic shell, said micelles having silica precipitated therein. The micelles are prepared by first admixing the selected block copolymer with water, preferably distilled or deionized water, generally in a concentration of from about 0.05 to about 5 percent by weight to obtain colorless polymolecular micelles of an average diameter of about 300 Angstroms or less. Subsequently, a tetraalkoxysilane wherein the alkyl group has from one to about 6 carbon atoms, such as tetraethoxysilane, is added to the dispersion of micelles, typically in a relative amount of from about 1 to about 30 percent by weight of micelles, and the dispersion is stirred until silica has precipitated into the micelles. Additional examples of suitable silane materials include tetramethoxysilane, tetra-n-propoxysilane, tetra-i-propoxysilane, tetra-n-butoxysilane, tetra-s-butoxysilane, tetra-i-butoxysilane, tetrapentoxysilane, tetrakis-(2-methoxyethoxysilane), and the like. The mixture is purified by an ultrafiltration process using, for example, membranes with a molecular weight cut-off of 50,000 to remove low molecular weight impurities. Subsequent to purification, the suspension of micelles can be concentrated for use in an ink or isolated by freeze-drying. It is believed that the network of silica precipitated within the polymeric micelles enhances the properties of an ink containing the particles, particularly with respect to thermal stability. Optionally, the silicated polymeric micelles can be colored by reacting them with a dye to obtain particles having dye molecules covalently attached thereto, as disclosed in copending application U.S. Ser. No. 07/544,564.

The block copolymer particles are present in the inks of the present invention in any effective amount, typically from about 0.1 to about 15 percent by weight, and preferably from about 0.5 to about 5 percent by weight, although the amount can be outside of this range.

Other additives can also be present in the inks of the present invention. For example, surfactants or wetting agents can be added to the ink. These additives may be of the cationic, anionic, or nonionic types. Suitable surfactants and wetting agents include Tamol® SN, Tamol® LG, those of the Triton® series available from Rohm and Haas Company, those of the Marasperse® series, those of the Igepal® series available from GAF Company, those of the Tergitol® series, those of the Duponol® series available from E.I. Du Pont de Nemours & Company, Emulphor ON 870 and ON 877, available from GAF, and other commercially available surfactants. These surfactants and wetting agents are present in effective amounts, generally from 0 to about 15 percent by weight, and preferably from about 0.01 to about 8 percent by weight.

Polymeric additives can also be added to the inks of the present invention to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like. Polymeric additives may be present in the ink of the present invention in amounts of from 0 to about 10 percent by weight, and preferably from about 0.01 to about 5 percent by weight.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, humectants and penetration control additives such as ethylene glycol, diethyleneglycol, N-methylpyrrollidinone, propylene glycol, hydroxyethers, ethers, amides, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

Inks of the present invention can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. Any other suitable processes for preparing the inks can also be employed.

The present invention is also directed to a printing process which comprises applying an ink according to the present invention to a substrate in imagewise fashion. In a specific embodiment, the present invention includes a process which comprises incorporating into an ink jet printing apparatus an ink composition according to the present invention and causing droplets of the ink to be ejected in an imagewise pattern onto a substrate, thereby generating images on the substrate. In a particularly preferred embodiment, the apparatus is a thermal ink jet printer and the ink is selectively heated in imagewise fashion, thereby causing ejection of the droplets to form an image on the substrate. The ink compositions of the present invention can be used to form images on a wide variety of substrates, including plain papers such as Xerox® 4024 papers, Xerox® 4200 papers, Xerox® 10 series paper, canary ruled paper, ruled notebook paper, bond paper such as Gilbert 25 percent cotton bond paper, Gilbert 100 percent cotton bond paper, and Strathmore bond paper, silica coated papers such as Sharp Company silica coated paper, JuJo paper, and the like transparency materials such as Xerox® 3R3351, Tetronix ink jet transparencies, Arkright ink jet transparencies, and the like, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A control dye based ink was prepared comprising 3 percent by weight of Food Black #2 dye (obtained from Bayer), 5.25 percent by weight of diethylene glycol, 6 percent by weight of polyethylene glycol 400, and 85.75 percent deionized water by dissolving the other ink ingredients in the water. The ink was heated for about 3 hours at 50° C., cooled, and filtered twice through a 0.45 micron Teflon ® filter.

Four inks according to the present invention were then prepared by adding to portions of the control ink block ABA copolymer nanosized particles in amounts of 1, 2, 3, and 4 percent by weight. The nanosized copolymer particles were prepared as follows. Tetraethoxysilane (3.12 milliliters) was added to a solution of 12.24 grams of Pluronics F-68 (an ethylene oxide-propylene oxide-ethylene oxide block copolymer wherein the ethylene oxide blocks have an average molecular weight of 3340 and the propylene oxide block has an average molecular weight of 1750, obtained from BASF) in 675 milliliters of deionized water. The mixture was stirred vigorously with a magnetic stirrer for 45 minutes, resulting in formation of colorless nanosized particles. Subsequently, the colorless particles were colored by adding 67.5 milliliters of 11.09 molar aqueous ammonium hydroxide to the mixture, stirring the clear mixture for 24 hours at room temperature, and then adding to a 200 milliliter aliquot of this mixture a solution of 2.0 grams of Duasyn Black RL-SF dye in 50 milliliters of water. The resulting mixture was stirred overnight at room temperature, and the excess unreacted dye was removed by ultrafiltration, followed by isolation of the black particles by freeze drying to yield 2.1 grams of the particles, which exhibited an average particle diameter of 20 nanometers, as determined by transmission electron microscopic analysis. An ink containing 4 percent by weight of the particles was prepared by adding 0.41 gram of the particles to 9.59 grams of the control ink and placing the mixture in an ultrasound bath for 20 minutes. Additional inks containing 3 percent, 2 percent, and 1 percent by weight of the particles were prepared by diluting portions of the ink containing 4 percent by weight particles with additional amounts of the control ink.

The control ink and the five inks according to the present invention were then incorporated into an ink jet test fixture and jetted. The following drop volumes were observed:

| % By Weight Particles | Drop Volume (Picoliters) |
| --- | --- |
| 4 | 95 ± 1 |
| 3 | 96 ± 1 |
| 2 | 100 ± 1 |
| 1 | 94 ± 6 |
| 0 | 69 ± 3 |

As the data indicate, the inks of the present invention containing the block copolymer particles exhibited significantly greater drop volume than the ink containing no particles. In addition, while both the control ink and the ink containing 1 percent by weight of the particles exhibited relatively large variations in drop volume, the inks containing 2 percent by weight and more of the particles exhibited relatively small variations in drop volume.

Thereafter, the control ink and the ink containing 2 percent by weight of the particles were incorporated into a Hewlett Packard HP Deskjet thermal ink jet printer and prints were generated onto #14 Champion Courtland paper. The drying times for both inks were the same (16 seconds on the wire side, 10 seconds on the felt side), indicating that the presence of the particles had no adverse effect on drying time. Waterfastness tests indicated that prints made with the ink containing 2 percent by weight of the block copolymer particles were 50 percent more waterfast than prints made with the control ink (23 percent retention of optical density for the control ink and 35 percent retention of optical density for the ink containing 2 percent by weight of the particles, after immersing the prints in water for 2 minutes).

EXAMPLE II

A dye based ink was prepared comprising 3 percent by weight of Food Black #2 dye (obtained from Bayer), 5.25 percent by weight of diethylene glycol, 6 percent by weight of polyethylene glycol 400, and 85.75 percent deionized water by dissolving the other ink ingredients in the water. The ink was heated for about 3 hours at 50° C., cooled, and filtered twice through a 0.45 micron Teflon ® filter.

An ink according to the present invention was then prepared by adding to the ink colorless silicated ABA copolymer nanosized particles in an amount of 2 percent by weight. The nanosized copolymer particles were prepared as follows. Tetraethoxysilane (3.12 milliliters) was added to a solution of 12.24 grams of Pluronics F-68 (an ethylene oxide-propylene oxide-ethylene oxide block copolymer wherein the ethylene oxide blocks have an average molecular weight of 3340 and the propylene oxide block has an average molecular weight of 1750, obtained from BASF) in 675 milliliters of deionized water. The mixture was stirred vigorously with a magnetic stirrer for 45 minutes. Subsequently, the colorless particles were silicated by adding 67.5 milliters of 11.09 molar aqueous ammonium hydroxide to the mixture and stirring the clear mixture for 24 hours at room temperature, resulting in formation of colorless nanosized silicated particles. These particles were purified by ultrafiltration and isolated by freeze drying to yield 1.8 grams of the white particles, which exhibited an average particle diameter of 20 nanometers, as determined by transmission electron microscopic analysis. An ink containing 2 percent by weight of the particles was prepared by adding 0.205 gram of the particles to 9.59 grams of the ink and placing the mixture in an ultrasound bath for 20 minutes.

EXAMPLE III

A dye based ink was prepared comprising 3 percent by weight of Food Black #2 dye (obtained from Bayer), 5.25 percent by weight of diethylene glycol, 6 percent by weight of polyethylene glycol 400, and 85.75 percent deionized water by dissolving the other ink ingredients in the water. The ink was heated for about 3 hours at 50°

C., cooled, and filtered twice through a 0.45 micron Teflon ® filter.

An ink according to the present invention was then prepared by adding to the ink black ABA copolymer nanosized particles in an amount of 2 percent by weight. The nanosized black copolymer particles were prepared as follows. A solution of 12.24 grams of Pluronics F-68 (an ethylene oxide-propylene oxide-ethylene oxide block copolymer wherein the ethylene oxide blocks have an average molecular weight of 3340 and the propylene oxide block has an average molecular weight of 1750, obtained from BASF) in 675 milliliters of deionized water was stirred vigorously with a magnetic stirrer for 45 minutes. The colorless particles were colored by adding 67.5 milliliters of 11.09 molar aqueous ammonium hydroxide to the mixture, stirring the clear mixture for 24 hours at room temperature, and then adding to a 200 milliliter aliquot of this mixture a solution of 2.0 grams of Duasyn Black RL-SF dye in 50 milliliters of water. The resulting mixture was stirred overnight at room temperature, and the excess unreacted dye was removed by ultrafiltration, followed by isolation of the black particles by freeze drying to yield 2.0 grams of the particles. An ink containing 2 percent by weight of the particles was prepared by adding 0.205 gram of the particles to 9.59 grams of the ink and placing the mixture in an ultrasound bath for 20 minutes.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition which comprises an aqueous liquid vehicle, a water-soluble dye, and particles of a block copolymer of the formula ABA, wherein A represents a hydrophilic segment and B represents a hydrophobic segment, said ABA particles having an average diameter of about 300 Angstroms or less, wherein the A segments exhibit a solubility in water of at least about 0.2 gram per milliliter and the B segment exhibits a solubility in water of no more than about 0.01 gram per milliliter.

2. An ink composition according to claim 1 wherein the particles have an average diameter of about 200 Angstroms or less.

3. An ink composition according to claim 1 wherein the liquid vehicle comprises a mixture of water and a water-miscible organic component.

4. An ink composition according to claim 3 wherein the water-miscible organic component is selected from the group consisting of ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and mixtures thereof.

5. An ink composition according to claim 1 wherein the A segments of the block copolymers are of monomers selected from the group consisting of oxyethylenes, aminoethylenes, vinyl carboxylic acids and their corresponding esters of the general formula:

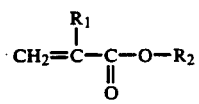

wherein $R_1$ and $R_2$ are independently selected from hydrogen and alkyl groups with from 1 to about 20 carbon atoms, oxazolines of the general formula

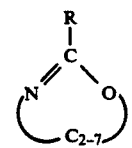

wherein R is hydrogen, an alkyl group with from 1 to about 6 carbon atoms, or benzyl and the ring has from about 2 to about 7 carbon atoms in addition to the carbon atom situated between the nitrogen and oxygen atoms, acrylamides of the general formula

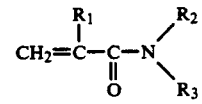

wherein $R_1$ is hydrogen, methyl, or ethyl, and $R_2$ and $R_3$ are independently selected from hydrogen, alkyl groups with from 1 to about 4 carbon atoms, hydroxyalkyl groups with from 1 to about 4 carbon atoms, and amino-substituted alkyl groups, vinyl ethers of the general formula

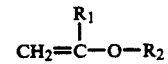

wherein $R_1$ is selected from the group consisting of hydrogen, methyl, and ethyl, and $R_2$ is selected from hydroxy-substituted alkyl groups and amino-substituted alkyl groups, and mixtures thereof.

6. An ink composition according to claim 1 wherein each A segment of the block copolymers has a molecular weight of from about 500 to about 20,000.

7. An ink composition according to claim 1 wherein the B segment of the block copolymers is of monomers selected from the group consisting of oxypropylenes, vinyl monomers, acrylic monomers and esters of monocarboxylic acids, olefins, and mixtures thereof.

8. An ink composition according to claim 1 wherein each B segment of the block copolymers has a molecular weight of from about 500 to about 20,000.

9. An ink composition according to claim 1 wherein the block copolymers are selected from the group consisting of ABA block copolymers wherein the A blocks are polyethylene oxide and the B block is polypropylene oxide, ABA block copolymers wherein the A blocks are 2-hydroxyethyl vinylether polymers and the B block is a polymer of butyl vinyl ether, ABA block copolymers wherein the A blocks are polyethylene oxide and the B block is a polymer of 2-hydroxyethyl methacrylate, and mixtures thereof.

10. An ink composition according to claim 1 wherein the copolymer particles are present in the liquid vehicle in an amount of from about 0.5 to about 15 percent by weight.

11. An ink composition according to claim 1 wherein the water-soluble dye is present in an amount of from about 0.5 to about 10 percent by weight.

12. An ink composition according to claim 1 wherein the particles comprising a block copolymer of the formula A-B-A have silica precipitated therein.

13. An ink composition according to claim 12 wherein the silica is contained in the copolymer particles in an amount of from about 1.5 to about 39.5 percent by weight.

* * * * *